L. V. ROOD.
TIRE REPAIR TOOL.
APPLICATION FILED JAN. 20, 1916.
1,192,937.
Patented Aug. 1, 1916.
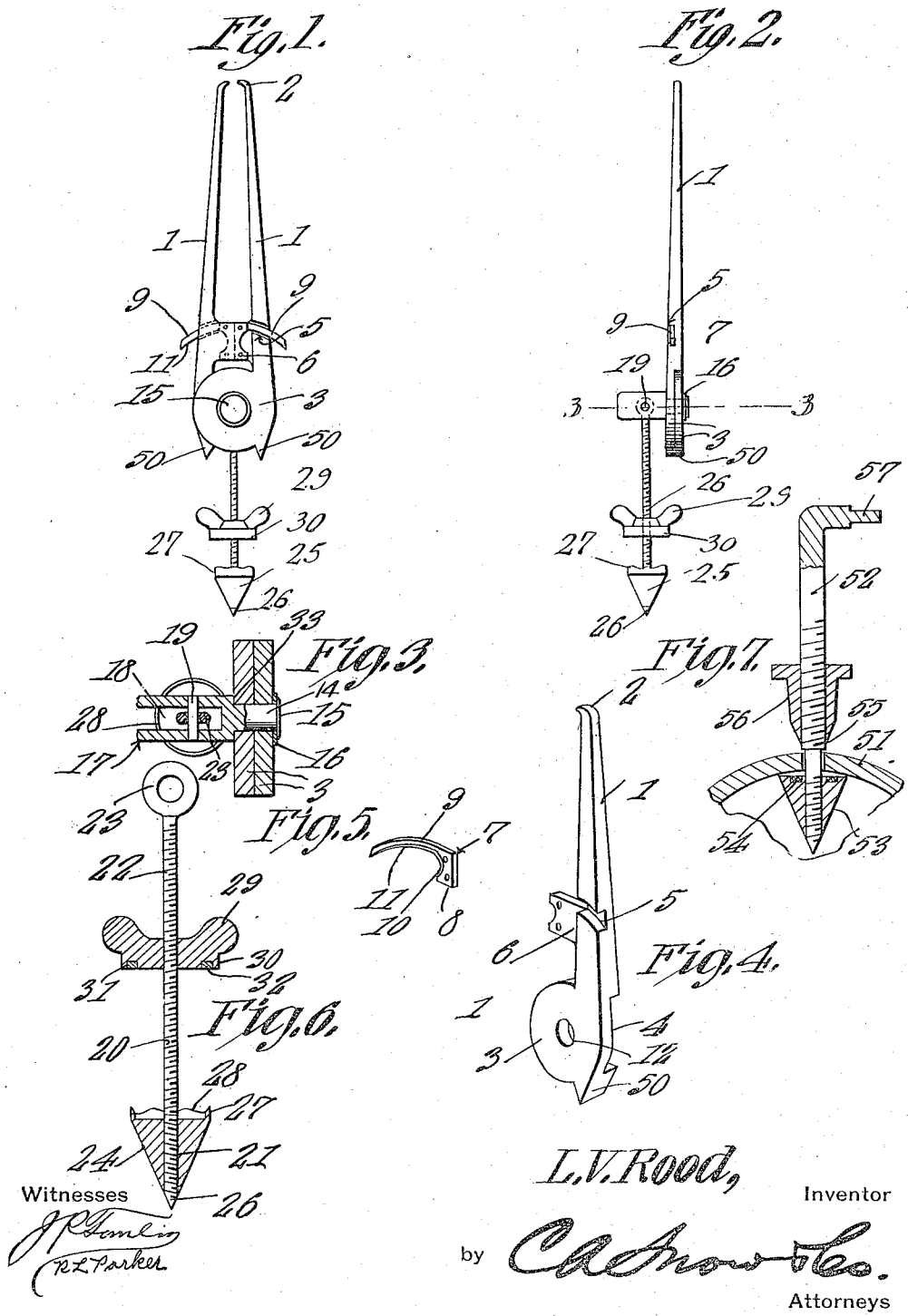
L. V. Rood, Inventor

UNITED STATES PATENT OFFICE.

LLOYD V. ROOD, OF MARIETTA, OHIO.

TIRE-REPAIR TOOL.

1,192,937.     Specification of Letters Patent.     Patented Aug. 1, 1916.

Application filed January 20, 1916. Serial No. 73,201.

*To all whom it may concern:*

Be it known that I, LLOYD V. ROOD, a citizen of the United States, residing at Marietta, in the county of Washington and State of Ohio, have invented a new and useful Tire-Repair Tool, of which the following is a specification.

The device forming the subject matter of this application is adapted to be employed for cutting a circular hole in the inner tube of a tire, or in another structure of a like sort, for plugging up the hole thus formed, and for cutting off the plug. The invention aims to provide a tool of this type which, when not in use, may be disposed in a small compass.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—Figure 1 shows the invention in side elevation; Fig. 2 is an elevation wherein the structure is viewed at right angles to the showing of Fig. 1; Fig. 3 is a cross section on the line 3—3 of Fig. 2, the nut which forms a part of the cutting means being omitted; Fig. 4 is a perspective view showing one of the levers; Fig. 5 is a perspective view showing one of the cutters; Fig. 6 is a sectional view showing the means whereby the hole is cut in the tire or other object; Fig. 7 is a sectional detail showing a modified form of the invention.

In carrying out the present invention there is provided a pair of levers 1, suitably shaped as indicated at 2, at their free ends, so that the levers may be used as pliers. The levers 1 terminate in heads 3, each being cut away at its sides, as shown at 4, to receive the head 3 of the other lever. Intermediate their ends, and relatively near to the heads 3 the levers 1 are supplied with recesses 5. Projecting from the edges of the levers 1, near the recesses 5 are arms 6. Secured to each arm 6 is a blade denoted generally by the numeral 7, the blade 7 including a body 8 and a curved arm 9. In the forward edge of the body 8 there is fashioned a notch 10. The cutting edge of the arm 9 is designated by the reference character 11, and this cutting edge 11 is extended into the notch 10. The heads 3 are supplied with openings 12 adapted to receive a pivot element 14, provided at one end with a head 15, a washer 16 being interposed between the head 15 and the adjacent lever 1, if desired. The opposite end of the pivot element 14 includes an extension 17 defining a shoulder 33, the levers 1 thus being mounted to swing on the pivot element 14 and being held against lateral separation by the washer 16 and the head 15 on the one hand and the shoulder 33 on the other hand. In the extension 17 of the pivot element 14 is formed a longitudinal recess 18 of considerable size and opening through the end of the extension as shown best in Fig. 3. Extended across the recess 16 and terminally mounted in the extension 17 of the pivot element 14 is a pivot pin 19.

The invention comprises a stem 20 left hand threaded adjacent the lower end, as indicated at 21, and right hand threaded adjacent its upper end as indicated at 22. The upper end of the stem 20 is provided with an eye 23 which lies in the recess 18 of the extension 17 of the pivot element 14 and is mounted to swing on the pivot pin 19.

The invention includes a combined opener and cutting member denoted generally by the numeral 24 and of tapered or conical form. The outer wall of the abutment and cutting member 24 slopes as shown at 25 to correspond to the slope on a point 26 fashioned on the extreme lower end of a stem 20. The cutting member and abutment 24 engages with the threaded portion 21 of the stem 20. The upper end of the member 24 is equipped preferably with an annular cutter 27, the edge of which is serrated as shown at 28. Engaged with the threaded portion 22 of the stem 20 is a wing nut 29 including a body 30 provided with a recess 31 in which is disposed a ring or seat 32, preferably made of lead or some other metal which is soft enough not to damage seriously the cutting edge 27.

In practical operation, the abutment and cutting member 24 is thrust through the perforation of the tire or tube, the conical construction of the part 24 and the point 26 on the stem 20 facilitating such an operation. The nut 29 then is rotated and advances toward the member 24, the cutter 27 being engaged by the seat 32, and an annular piece being cut out of the tire or tube. Since the nut 29 and the combined cutter and abutment 24 are threaded in opposite directions onto the stem 20, the nut 29, when it is rotated, will have no tendency to detach the member 24 from the stem 20.

By the operation above described, a circular piece will be cut out of the tire tube, and the piece may be removed along with the stem 20 and the parts carried thereby. The plug which is to be inserted into the hole formed in the tire or tube, is grasped between the ends 2 of the levers 1, the tool thus acting as a pair of pliers, and the plug being inserted into the opening formed in the tire or tube. The levers 1 then are swung apart on the pivot element 14 and, when the levers 1 are brought together again, the plug will be cut off by the cutting edge 11 that extends onto the notch 10, the arms 9 on the respective levers 1 being disposed in crossed relation, and the recess 5 in each lever 1 being adapted to receive the arm 9 on the other lever. The heads 3 are provided with projections 50 which interengage when the levers 1 are spread apart, and prevent the parts 9 from being withdrawn from the recesses 5.

When the occasion for the use of the tool has passed, the stem 20 may be swung upwardly, referring to Fig. 2, until it lies substantially parallel to the levers 1, the pivot element 14 rotating in the heads 3 of the levers or if desired, the stem may be swung up through the open end of the recess 18. In this manner, the tool may be disposed in small compass. Further, because the pivot element 14 rotates in the heads 3, and because the eye 23 of the stem 20 is mounted to swing on the pivot pin 19, the stem 20, to all intents and purposes, is swiveled to the levers 1 which form a handle, so that the levers may be disposed at any desired angle with respect to the axis of the stem 20, when the abutment and cutting member 24 and the nut 29, or either or these elements, is in use.

When the cutters 11 are being used to sever the plug, the stem 20 may be used as a support adapted to be grasped in the left hand of the operator, and under such circumstances, the part 24 serves to prevent the hand of the operator from slipping off the stem 20.

In Fig. 7 of the drawings, the tire to be cut is shown at 51 and the stem is shown at 52. In this form of the invention, the abutment 53 carries a seat 54 adapted to coact with a cutting edge 55 formed on the nut 56. The pivot element 57 which unites the levers is formed integrally with the stem 52.

Having thus described the invention, what is claimed is:—

1. In a device of the class described, a pair of plug-cutting levers; a pivot element connecting the levers; a stem carried by the pivot element; and a tube cutter mounted on the stem, the pivot element being rotatable in the levers to permit the stem to be disposed in parallel relation to the levers and to permit the stem to extend from the pivot element in the same direction as the levers.

2. In a tool of the class described, a pair of plug cutting levers; a pivot element uniting the levers; a stem mounted to swing on the pivot element, parallel to the axis of the pivot element, the pivot element being rotatable in the levers; and a hole cutter carried by the stem.

3. In a device of the class described, a stem; a combined opener and abutment threaded in one direction onto one end of the stem, and including a cutter; a handle; a nut threaded in an opposite direction onto the stem, and adapted to coöperate with the cutter; a pin journaled in the handle; and a second pin carried by the first specified pin and disposed at right angles to the axis of the first specified pin, the other end of the stem being mounted to swing on the second pin.

In testimony that I claim the foregoing as my own, I have hereto affixed my signature in the presence of two witnesses.

LLOYD V. ROOD.

Witnesses:
D. T. CARR,
HARRY R. BUCHANAN.

Copies of this patent may be obtained for five cents each, by addressing the "Commissioner of Patents. Washington, D. C."